United States Patent [19]
Sato et al.

[11] Patent Number: 5,164,925
[45] Date of Patent: Nov. 17, 1992

[54] OPTO-MAGNETIC RECORDING APPARATUS HAVING OVER-WRITE AND NON-OVER-WRITE MODES

[75] Inventors: Masatoshi Sato, Machida; Toshihiko Kawai, Kawasaki, both of Japan

[73] Assignee: Nikon Corporation, Tokyo, Japan

[21] Appl. No.: 469,478

[22] PCT Filed: Aug. 11, 1989

[86] PCT No.: PCT/JP89/00815
§ 371 Date: May 21, 1990
§ 102(e) Date: May 21, 1990

[87] PCT Pub. No.: WO90/01769
PCT Pub. Date: Feb. 22, 1990

[30] Foreign Application Priority Data
Aug. 11, 1988 [JP] Japan .................. 63-200923

[51] Int. Cl.⁵ .................. G11B 13/04; G11B 11/12
[52] U.S. Cl. .................. 369/13; 360/114; 360/66
[58] Field of Search .................. 369/13, 14; 360/59, 360/114, 66, 60; 365/122

[56] References Cited

U.S. PATENT DOCUMENTS

| | | | |
|---|---|---|---|
| 4,855,975 | 8/1989 | Akasaka et al. | 360/59 |
| 4,908,809 | 3/1990 | Tadokoro et al. | 360/59 |
| 4,910,622 | 3/1990 | Saito et al. | 369/13 |

FOREIGN PATENT DOCUMENTS

| | | | |
|---|---|---|---|
| 0258978 | 3/1988 | European Pat. Off. | |
| 62-66451 | 3/1987 | Japan | 360/114 |
| 62-175948 | 8/1987 | Japan | |
| 63-91864 | 4/1988 | Japan | |
| 63-94450 | 4/1988 | Japan | |

OTHER PUBLICATIONS

"Simple Nikon Technique Permits Erase and Write in One Pass", Electronic, Apr. 16, 1987, p. 33.
Swartz et al., "Stabilized Biasing of Semiconductor Lasers", *The Bell System Technical Journal*, Sep. 1983, vol. 62, No. 7, Part 1, pp. 1923-1936.
U.S. Ser. No. 453,255 filed Dec. 20, 1989 for "Over Write Capable Magnetooptical Recording Method, and Magnetooptical Recording Apparatus and Medium Used Therefor"—Sato et al.

*Primary Examiner*—Stuart S. Levy
*Assistant Examiner*—Hoa Nguyen
*Attorney, Agent, or Firm*—Shapiro and Shapiro

[57] ABSTRACT

An opto-magnetic recording apparatus comprises a rotation device for rotating an opto-magnetic recording medium, an initial auxiliary magnetic field applying device, a laser beam source, a modulation device for pulse-modulating the beam intensity, in accordance with the binary information to be recorded, between a high level for magnetizing the recording medium to one of two states and a low level for magnetizing the same to the other state, and a recording magnetic field applying device. The apparatus further has a shifting device for shifting the initial auxiliary magnetic field applying device at least between two positions including a first position for over-write mode operation where the initial auxiliary magnetic field applying device applies the initial auxiliary magnetic field to the recording medium and a second position for non-over-write mode operation where the initial auxiliary magnetic field applying device does not apply the initial auxiliary magnetic field to the recording medium.

7 Claims, 11 Drawing Sheets

FIG.9 TYPE 1

FIG.10 TYPE 2

OPTO-MAGNETIC RECORDING APPARATUS HAVING OVER-WRITE AND NON-OVER-WRITE MODES

TECHNICAL FIELD

The present invention relates to an over-write opto-magnetic recording apparatus which is capable of over-writing information by light-intensity modulation alone without requiring modulation of direction of the recording magnetic field Hb.

BACKGROUND ART

In recent years, efforts have been directed toward development of an opto-magnetic recording/reproducing method which would satisfy various requirements such as higher recording density, greater storage capacity, higher access speed and higher recording/reproducing speed, as well as toward development of recording apparatus, reproducing apparatus and recording medium which would be used in carrying out such an opto-magnetic recording/reproducing method.

Among a variety of optical recording/reproducing methods, opto-magnetic recording/reproducing is most promising because its allow for erasure of recorded information and recording of new information after erasion, which enables repeated use of the recording medium.

However, when a recording medium is to be re-used, it is generally necessary that (i) the medium is initialized by an initializing device, (ii) that a recording apparatus is provided with an erase head similar to that of the recording head or (iii) that erasing operation is conducted as a preparatory step by a recording device or an erasion device.

Such requirements tend to make opto-magnetic recording impractical for over-writing of information, i.e., recording of new information regardless of whether the recording medium has information recorded thereon.

Over-writing could also be achieved if the direction of the recording magnetic field Hb could be freely modulated between a "direction A" (e.g., an upward direction) and a "direction counter to A" (e.g., a downward direction). However, it is impossible as a practical matter to modulate the direction of the recording magnetic field Hb at sufficiently high speed. For instance, when the recording magnetic field Hb is provided by a permanent magnet, it would be necessary to mechanically invert the orientation of the magnet at a high speed. This is practically impossible. A similar problem is encountered also when the recording magnetic field Hb is provided by a solenoid, because it is practically impossible to modulate the direction of the large current at such a high speed.

As a result of recent progress in the art, there has been developed an opto-magnetic recording method which enables over-writing solely by modulating the intensity of recording light in accordance with the binary information to be recorded, without requiring the magnetic field Hb to be turned on and off or direction-modulated, as well as an over-writable recording medium and recording apparatus which enables such over-writing, as disclosed in Japanese Patent Unexamined Publication No. 62-175948.

One of the features of this known technique resides in the use of an opto-magnetic recording medium made of a laminated vertical magnetization film of two-layered structure composed of a recording layer (first layer) and an auxiliary recording layer (second layer). The information is recorded in the first layer and also in the second layer as required, with a bit having "A direction" and a bit having "counter A direction".

This known over-writing method has the following steps:

(a) to move the recording medium
(b) applying an initial auxiliary field Hini so as to orient the magnetization of the second layer in the "A direction" while maintaining the magnetization of the first layer unchanged until the recording is conducted;
(c) irradiating the medium with a laser beam;
(d) pulse-modulating the intensity of the beam in accordance with the binary information to be recorded;
(e) applying, when the medium is irradiated with the beam, a recording magnetic field to the irradiated portion of the recording medium; and
(f) forming, when the intensity level of the pulse beam is high, one of a bit having the "A direction" and a bit having the "counter A direction", while forming the other bit when the level of intensity of the pulse beam is low.

The recording with this opto-magnetic recording method is carried out by using, for example, an over-writable opto-magnetic recording apparatus having the following features:

means for moving an opto-magnetic recording medium;
means for applying an initial auxiliary magnetic field Hini;
a laser beam source;
modulation means for pulse-modulating the beam intensity, in accordance with the binary information to be recorded, between
(1) a high level which heats the recording medium to a temperature suitable for forming one of a bit having "A direction" and a bit having "counter A direction"; and
(2) a low level which heats the recording medium to a temperature suitable for forming the other of the bits; and
recording field application means which may be used also as the initial auxiliary magnetic field application means.

The laser beam intensity is pulse-modulated in accordance with the information to be recorded. Light intensity pulse-modulation per se is a known technique which is used in opto-magnetic recording. Means for pulse-modulating beam in accordance with binary information to be recorded also has been known. Such means is described, for example, in THE BELL SYSTEM TECHNICAL JOURNAL, Vol. 62 (1983), 1923–1936. The modulation means, therefore, can easily be obtained by partially modifying conventional modulation means if the required values of the high and low levels are known. Such a modification is a simple matter for those skilled in the art if the high and low levels are given.

One of the critical features of the above-mentioned known technique resides in the values of the high and low levels of the beam intensity. Namely, the high level of the pulse beam intensity enables the recording magnetic field Hb to reverse the "A direction" magnetization of the auxiliary recording layer (second layer) into "counter A direction", and the "counter A direction" magnetization thus developed in the second layer forms in the recording layer (first layer) a bit having "counter A direction" magnetization [or "A direction" magnetization]. When the beam intensity level is low, the "A direction" magnetization in the second layer forms in the first layer a bit of "A direction" magnetization [or "counter A direction" magnetization].

In this specification, expressions in brackets are used to indicate alternative conditions that correspond to one another.

Figure 1:
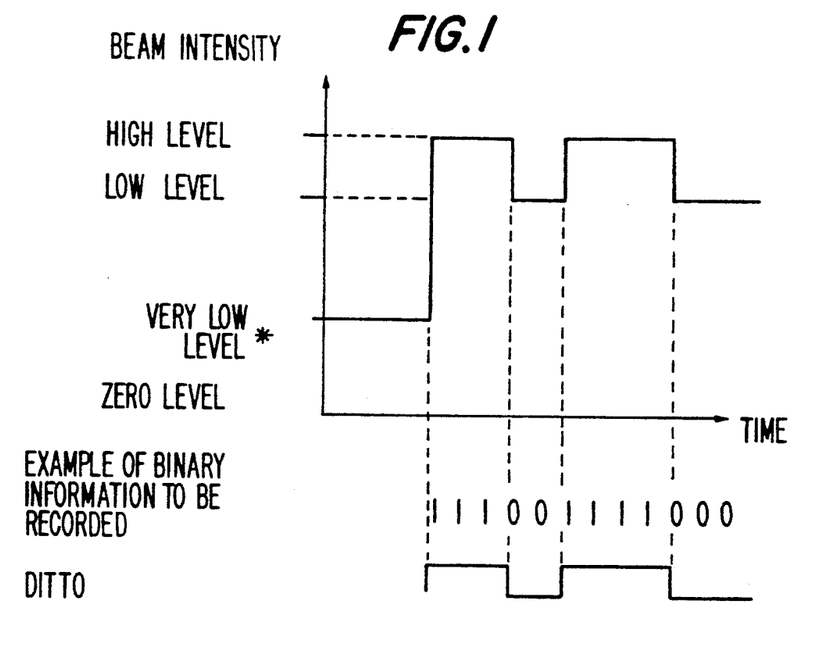
FIGS. 1 and 2 are graphs showing changes in beam intensities.

As is well known, it is an ordinary measure to maintain the laser beam on at a very low level even when recording is not to be conducted, for the purpose of, for example, making an access to a predetermined recording position on the medium. A laser beam of a very low level also is used in the case where reproduction relies upon the laser beam. Maintaining the laser beam at such a very low level is conducted also in the present invention. The aforementioned low level of the beam intensity for forming a bit, however, is higher than such a very low level. Thus, the laser beam has an output waveform as shown, for example, in FIG. 1.

Figure 2:
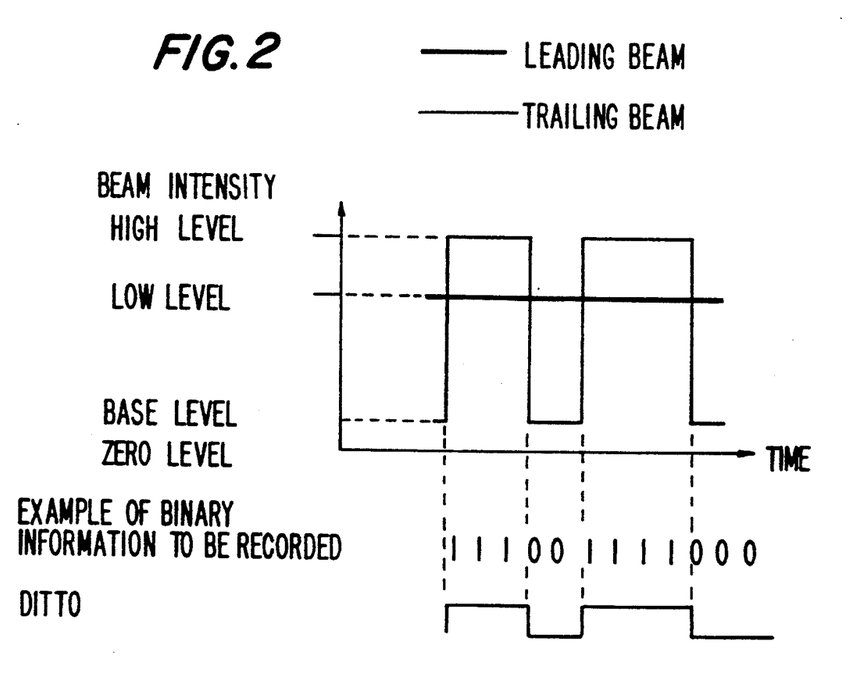

The recording beam may consist of two beams which are in close proximity to each other: more specifically, a non-modulated leading laser beam of a low level intended for erasion and a trailing beam modulated in accordance with the information to be modulated for the purpose of recording. The trailing beam is modulated to have a high level and a base level which may be zero level or a level equal to or lower than the low level of the leading beam. Thus, the output waveform may be as shown in FIG. 2.

Figure 3:
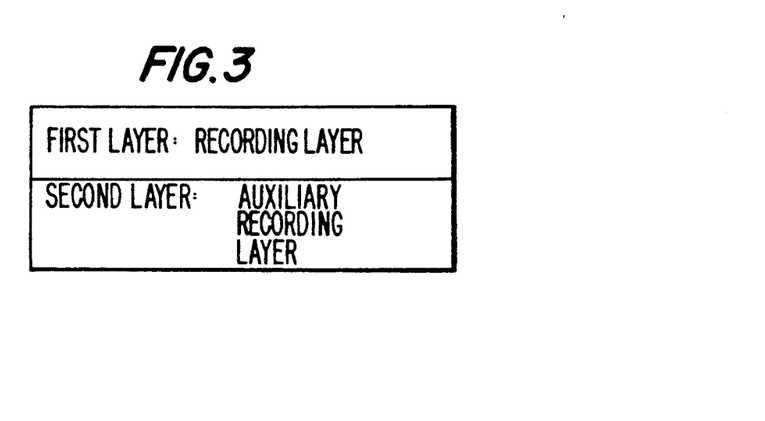
FIG. 3 is a schematic illustration of the construction of a recording medium.

The mediums used in the above-described known technique may be grouped into two types: hereinafter, a first form and a second form. In each case, the recording medium has a laminated structure composed of a recording layer (first layer) and an auxiliary recording layer (second layer) as shown in FIG. 3.

The first layer is a recording layer which exhibits a high coercive force at room temperature and also a low magnetization inversion temperature. On the other hand, the second layer is an auxiliary recording layer which exhibits a relatively low coercive force at room temperature and also a high magnetization inversion temperature. Each of the first and second layers may have a laminated structure. A third layer may exist between the first layer and the second layer. In addition, a medium can be used that does not have distinctive border between the first and second layers, i.e., a medium in which the first layer is progressively changed into the second layer.

The recording medium of the aforementioned first form satisfies the following formula 1 and meets the requirements of the formulae 2 to 5 at room temperature.

$$T_R < T_{C1} \approx T_L < T_{C2} \approx T_H \quad \text{formula 1}$$

$$H_{C1} > H_{C2} + |H_{D1} \mp H_{D2}| \quad \text{formula 2}$$

$$H_{C1} > H_{D1} \quad \text{formula 3}$$

$$H_{C2} > H_{D2} \quad \text{formula 4}$$

$$H_{C2} + H_{D2} < |H_{ini.}| < H_{C1} \pm H_{D1} \quad \text{formula 5}$$

where, $H_{C1}$ and $H_{C2}$ represent the coercive forces of the recording layer (first layer) and the auxiliary recording layer (second layer), $T_{C1}$, $T_{C2}$ represent the Curie points of the first layer and the second layer, $T_R$ represents room temperature, $T_L$ and $T_H$ represent the temperatures of the recording medium when irradiated by a laser beam of low level and a laser beam of high level, and $H_{D1}$ and $H_{D2}$ represent the coupling magnetic fields received by the first layer and the second layer, respectively.

In the formulae shown above, the symbol $\approx$ embraces "equal" or "substantially equal". In the symbols $\pm$ and $\mp$, $+$ and $-$ appearing at the upper part apply to a later-mentioned A-type (Anti-parallel type) medium, while $-$ and $+$ appearing at lower side apply to a later-mentioned P-type (Parallel type) medium. Ferromagnetic recording medium belongs to P type.

Figure 4:
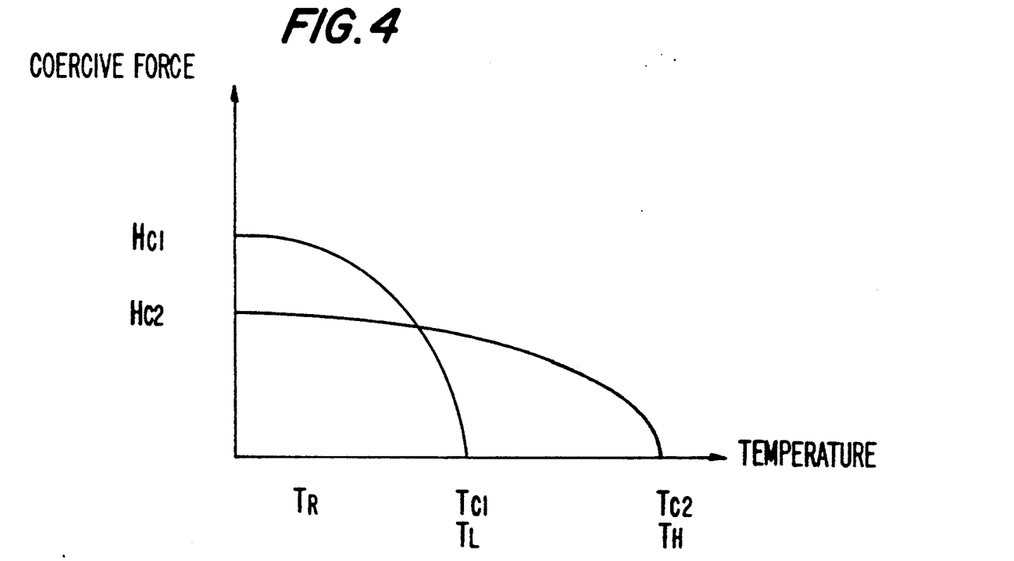
FIG. 4 is a graph showing the change in the coercive force versus temperature.

FIG. 4 is a graph showing, in fine and bold lines, the relationship between the coercive force and the temperature as observed with the first layer and the second layer, respectively.

When the initial auxiliary magnetic field (Hini,) is applied to this recording medium at room temperature, reversing of magnetization takes place only in the second layer, i.e., the direction of magnetization of the first layer is not changed. It is therefore possible to magnetize only the second layer in the "A direction" by applying the initial auxiliary magnetic field Hini. to this recording medium. As will be appreciated from the formula (4), the magnetization of the second layer is held without reversing again, even when the initial auxiliary magnetic field Hini. is reduced to zero.

Figure 5:
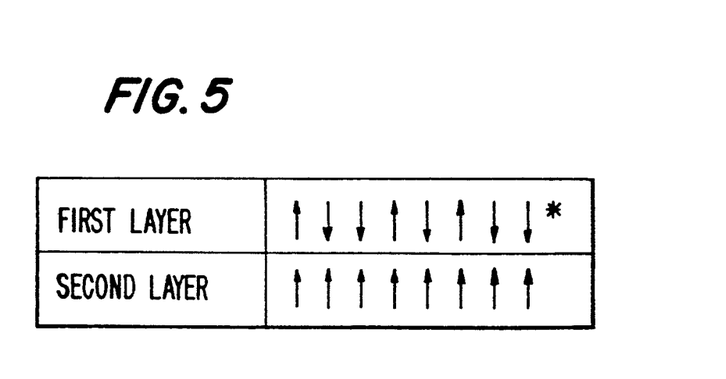
FIG. 5 is an illustration of the directions of magnetization in respective layers of a recording medium.

FIG. 5 represents the state of the recording medium in which only the second layer has been magnetized to "A direction" by the initial auxiliary magnetic field Hini. In the drawings, the "A direction" and the "counter A direction" are respectively shown by upward and downward arrows.

Referring to FIG. 5, the direction * of magnetization in the first layer represents the information which has been recorded. In the following description of FIGS. 6 and 7, the recorded information is expressed by X because the direction in this case has no significance.

Figure 6:
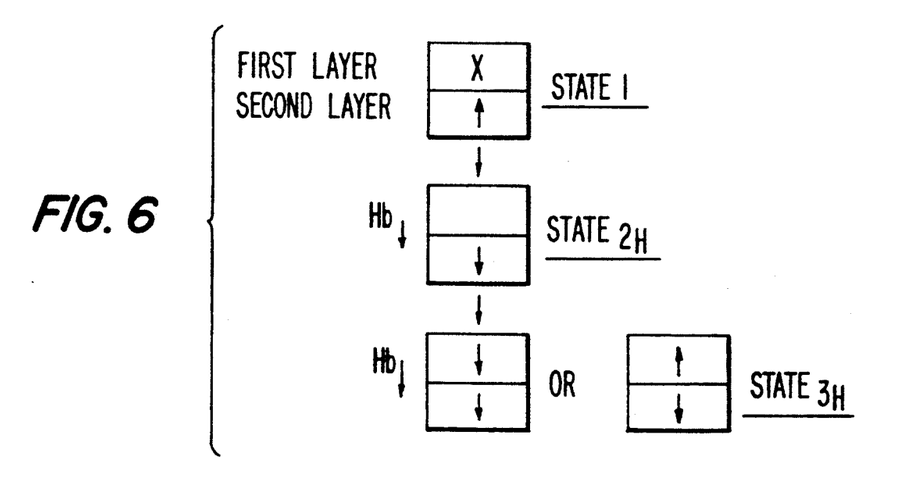
FIGS. 6 and 7 are illustrations of the states of change in the magnetization of the respective layers of the recording medium.

In state of FIG. 6, a laser beam of a high level is applied to raise the medium temperature to $T_H$. Since the temperature $T_H$ is higher than the Curie point $T_{C1}$, the magnetization of the recording layer (first layer) is extinguished. In addition, the magnetization of the auxiliary recording layer (second layer) also is extinguished substantially completely because the temperature $T_H$ is near the Curie point $T_{C2}$ of the second layer. A recording magnetic field Hb is then applied. The direction of the magnetic field is "A direction" or "counter A direction", depending on the type of the recording medium. The recording magnetic field Hb may be a floating magnetic field which floats from the medium. For the purpose of simplification of the description, it is assumed here that the recording magnetic field Hb applied is of the "counter A direction". Since the medium is moving, the irradiated portion of the recording medium is immediately moved apart from the laser beam so as to be cooled. When the temperature of the medium is lowered in the presence of the recording magnetic field Hb, the magnetization of the second layer is inverted by the magnetic field Hb so as to become magnetization of "counter A direction" (State $2_H$).

As the heat radiation proceeds to lower the medium temperature below $T_{C1}$, the magnetization of the first layer starts to appear again. In this case, the direction of magnetization of the first layer is influenced by the direction of the magnetization of the second layer due to magnetic coupling (exchanging coupling). In consequence, magnetization of the "counter A direction" (in case of the medium being of P type) or "A direction" (in case of the medium being of A type) is generated in the first layer, depending on the type of the medium (State $3_H$).

This change in the state caused by the laser beam of high level will be referred to as "high-temperature cycle", hereinafter.

Figure 7:
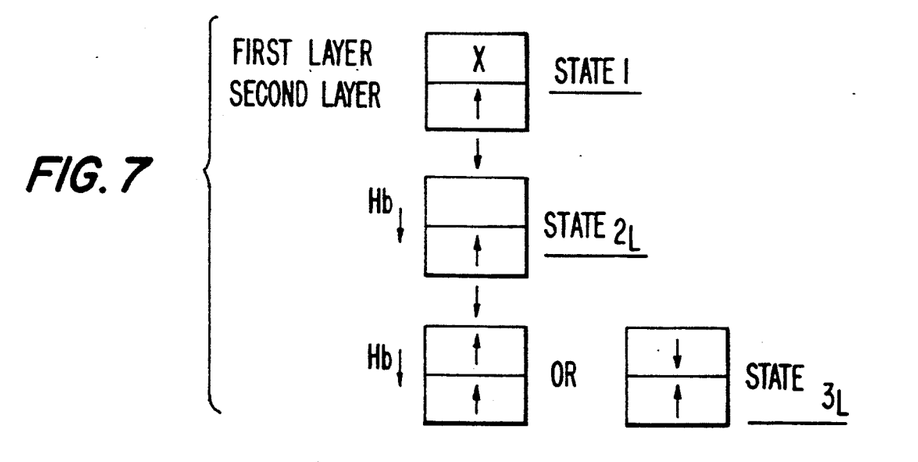

FIG. 7 shows the case when a laser beam of the low level is applied in the state 1 so as to raise the medium temperature to $T_L$. Since the temperature $T_L$ is near the Curie point $T_{C1}$, the magnetization of the first layer is extinguished substantially completely as will be seen from FIG. 7. However, the magnetization of the second layer is not extinguished because the temperature $T_L$ is lower than the Curie point $T_{C2}$ of the second layer (State $2_L$).

In this state, the recording magnetic field Hb is maintained in the same condition as that in the high-temperature cycle, because it is impossible to turn the recording magnetic field on and off at high speed, although the magnetic field Hb is unnecessary in this step.

The coercive force $H_{C2}$, however, still remains large so that the magnetic field Hb does not cause inversion of magnetization in the second layer. Since the medium is moving, the irradiated portion of the medium is immediately moved apart from the laser beam and cooled. As the cooling proceeds, the magnetization of the first layer appears again. The direction of the appearing magnetization is influenced by the direction of magnetization of the second layer due to the magnetic coupling. In consequence, magnetization of the "A direction" (in case of the medium being of P type) or "counter A direction" (in case of the medium being of A type) appears depending on the type of the medium. This magnetization is not changed even when the temperature is lowered to room temperature (State $3_L$).

This change in the state caused by the low-level laser beam will be referred to as "low-temperature cycle", hereinafter.

As will be understood from the foregoing description, the high-temperature cycle and the low-temperature cycle produce bits of opposite magnetization directions, regardless of the initial magnetization direction of the first layer. This means that over-writing is possible by modulating a laser beam between the high level (high-temperature cycle) and the low-level (low-temperature cycle) in accordance with the information to be recorded.

Although omitted from the foregoing description for the purpose of simplification, it should be noted that there is a medium composition which has a compensation temperature $T_{comp}$ between the Curie point and room temperature. Such a medium exhibits opposite directions of magnetization at both sides of the compensation temperature $T_{comp}$. When such a medium is used, therefore, the direction of application of the recording magnetic field Hb is reverse to the direction of magnetization exhibited at the room temperature by the bit formed in the high-temperature cycle.

In general, the recording medium is a disk that it is rotated during recording. Therefore, the recorded portion (bit) is subjected again to the initial field Hini. after one full rotation of the disk, so that the magnetization of the auxiliary recording layer (second layer) is aligned in the original direction, i.e., the "A direction". The magnetization of the second layer, however, does not affect the recording layer (first layer) at room temperature, so that the recorded information is maintained unchanged.

When a linear polarized light is applied to the first layer, the light reflected from the first layer contains the recorded information, so that reproduction can be conducted in the same way as that used for an ordinary opto-magnetic recording medium. According to the composition design of the first and second layers, a method is possible in which the information is transferred from the first layer to the second layer which has been aligned in the original "A direction" magnetization by application of a reproduction magnetic field $H_R$ in advance of the reproduction, or a method in which the information of the first layer is naturally transferred to the second layer as soon as the influence of Hini. is eliminated, without requiring application of the reproduction magnetic field $H_R$. In such a case, the information is reproduced from the second layer.

The vertical magnetization films constituting the recording layer (first layer) and the auxiliary recording layer (second layer) are made of a material which is selected from a group consisting of amorphous or crystalline phases of (1) ferro- or ferri-magnetic substances having a Curie point but no compensation temperature and (2) ferri-magnetic substances having both a compensation temperature and Curie point.

The first form of the recording medium described hereinabove makes use of the Curie point as the magnetization inverting temperature. A description will now be given of the second form of recording medium which makes use of the coercive force $H_C$ which has been reduced at a predetermined temperature higher than the room temperature. The principle of the second form of recording medium will be easily understood when the temperature $T_{S1}$ at which the recording layer (first layer) is magnetically coupled to the auxiliary recording layer (second layer) and the temperature $T_{S2}$ at which the second layer is inverted by Hb are used, respectively, in place of the Curie points $T_{C1}$ and $T_{C2}$ of the first and second layers in the first form.

The recording medium of the second form satisfies the following formula 6 and meets the requirements of the formulae 7 to 9 at room temperature.

| | |
|---|---|
| $T_R < T_{S1} \approx T_L < T_{S2} \approx T_H$ | formula 6 |
| $H_{C1} > H_{C2} + \|H_{D1} \mp H_{D2}\|$ | formula 7 |
| $H_{C1} > H_{D1}$ | formula 8 |
| $H_{C2} > H_{D2}$ | formula 9 |
| $H_{C2} + H_{D2} < \|Hini.\| < H_{C1} \pm H_{D1}$ | formula 10 | where, $H_{C1}$ and $H_{C2}$ represent the coercive forces of the recording layer (first layer) and the auxiliary recording layer (second layer), $T_{S1}$ represents the temperature at which the recording layer is magnetically coupled to the auxiliary recording layer, $T_{S2}$ represents the temperature at which the second layer is inverted by Hb, $T_R$ represents room temperature, $T_L$ and $T_H$ represent the temperatures of the recording medium when irradiated by a laser beam of low level and a laser beam of high level, and $H_{D1}$ and $H_{D2}$ represent the coupling magnetic fields received by the first layer and the second layer, respectively.

In the formulae shown above, in symbols $\pm$ and $\mp$, $+$ and $-$ appearing at the upper part apply to a later-mentioned A-type (Anti-parallel type) medium, while — and + appearing at lower side apply to a later-mentioned P-type (Parallel type) medium.

Both in the first and second forms of recording medium, the recording layer (first layer) and the auxiliary recording layer (second layer) are preferably made of an amorphous ferri-magnetic material selected from the group consisting of alloy compositions of transition metals, e.g., Fe, Co and so forth, and heavy rare earth metals, e.g., Gd, Tb, Dy and so forth.

When both the first and second layers are made of a material selected from a group consisting of alloy compositions of transition metals and heavy rare earth metals, the direction and magnitude of magnetization appearing to the outside are determined by the direction and magnitude of the spin of the transition metal (referred to as "TM") in the alloy and those of the spin of the heavy rare earth metal (referred to as "RE") in the alloy. The vector representing the direction and magnitude of the whole alloy are represented by the sum of the vectors representing the directions and magnitudes of the spins of TM and RE. In the alloy, however, the directions of the vectors of spins of the TM and the heavy RE are opposite to each other, due to interaction between both spins. Therefore, the vector of the alloy, i.e., the magnitude of magnetization appearing to the outside, is zero when both vectors are equal in magnitude. The alloy composition at which the externally recognized vector of alloy is zero is referred to as "compensation composition", hereinafter. When the composition is other than the compensation composition, the alloy has a vector of an magnitude equal to the difference between the magnitudes of both spins and the direction which is the same as the greater one of these two vectors. The magnetization of this vector appears to the outside.

When there is a difference in magnitude between TM spin and the RE spin in an alloy composition, the alloy composition is referred to as a TM-rich or RE-rich composition, depending on whether the intensity of the TM spin or the intensity of the RE spin is greater.

Figure 8:
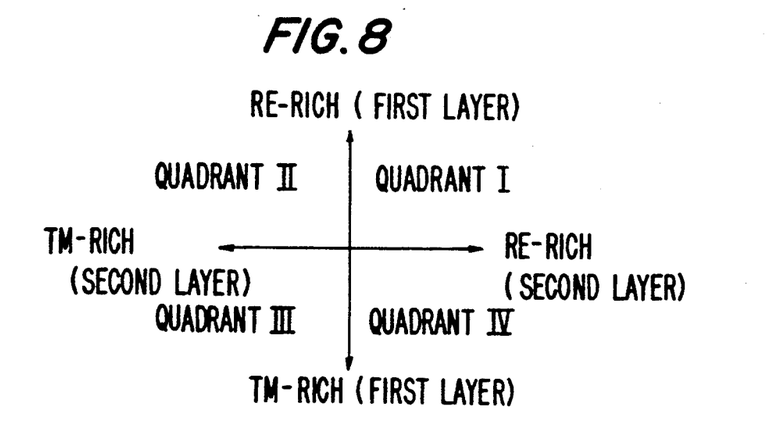
FIG. 8 is a diagram showing types of mediums which are grouped into four quadrants.
Figure 9:
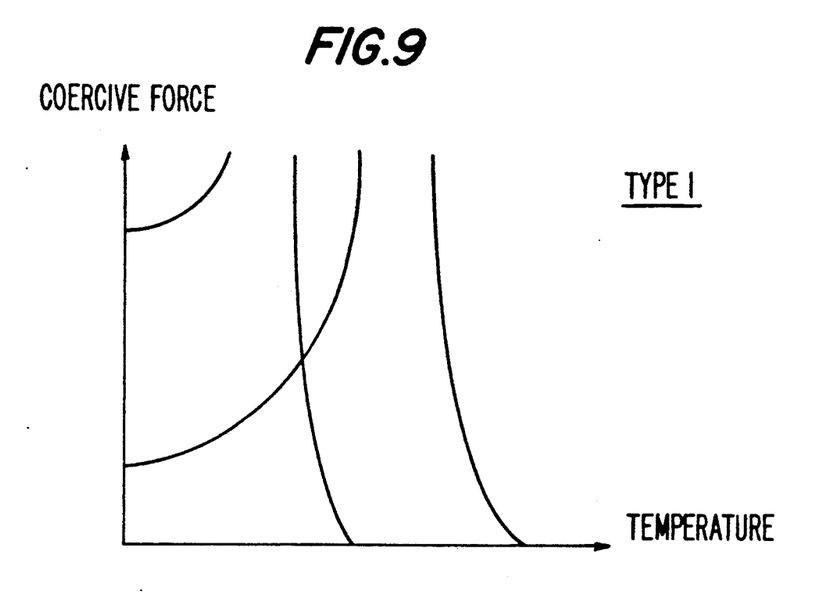
FIGS. 9 to 12 are graphs showing changes in coercive forces versus temperature in various types of mediums.
Figure 10:
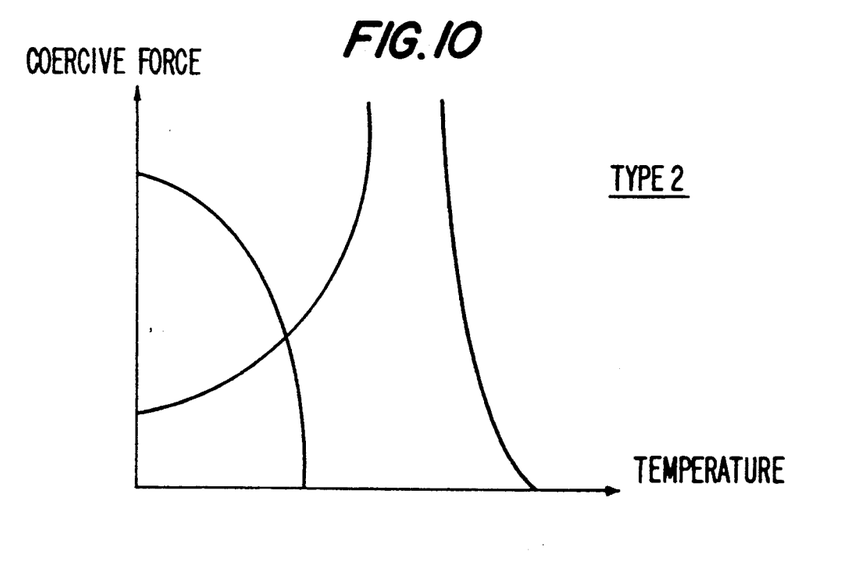
Figure 11:
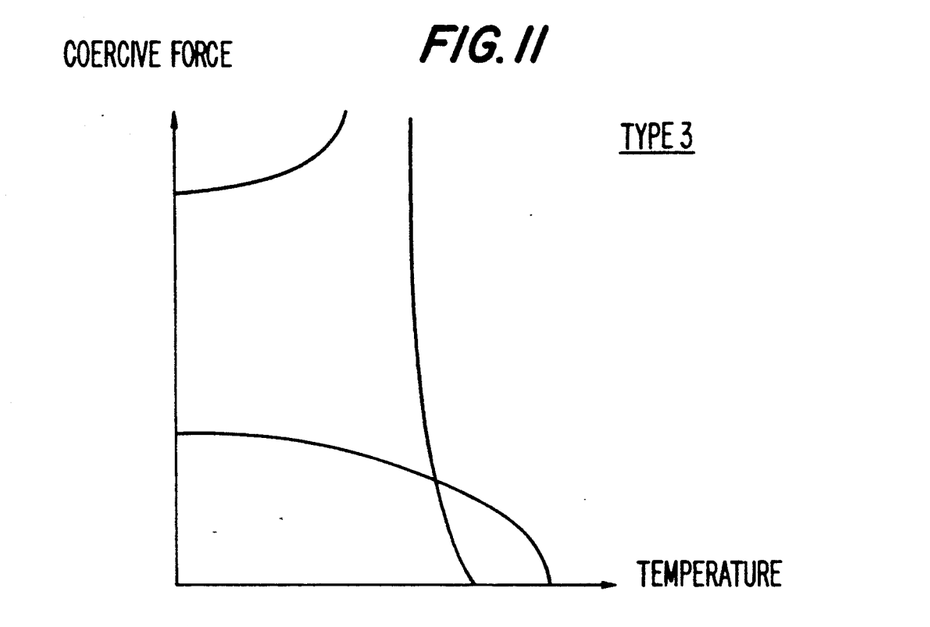
Figure 12:
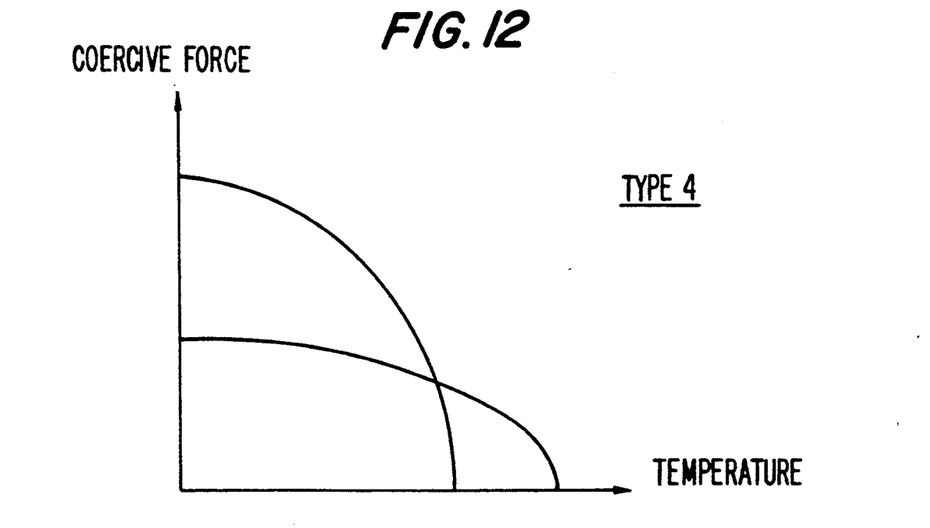

Each of the first and the second layers can be sorted into TM rich and RE-rich types. The known mediums, therefore, can be sorted into the following mediums, therefore, can be grouped diagrammatically in quadrants as shown in FIG. 8, wherein the composition of the first layer is represented by the axis of the ordinate and the composition of the second layer by the axis of the abscissa. The P-type medium mentioned before belongs to the quadrants I and III, while the A-type medium belongs to quadrants II and IV.

The point where the axes of the ordinate and abscissa cross each other represents the compensation composition of both layers.

Some alloy compositions exhibit a tendency that the coercive force is tentatively increased to an infinite level and then decreases before the Curie point, i.e., the temperature at which the coercive force becomes zero, is reached. The temperature which provides the infinite coercive force is referred to as compensation temperature (Tcomp). In case of TM-rich alloy compositions, no such compensation temperature exists between room temperature and the Curie point. Any compensation temperature below room temperature is meaningless in opto-magnetic recording. In this specification, therefore, the term "compensation temperature" is used to mean that existing between room temperature and the Curie point.

The recording mediums may be grouped into four types, when classified according to the presence or absence of the compensation temperature in the first and second layers. The medium of the first quadrant includes all of these four types, as will be seen in Table I. FIGS. 9 to 12 are graphs showing the relationships between the coercive force and the temperature. In these Figures, fine and bold lines show the relationships in the first and second layers, respectively.

The recording mediums are classified as shown in Table I, according to whether each of the first and second layers is RE-rich or TM-rich and whether each has compensation temperature or not.

TABLE 1

| QUADRANT I (P Type) | | | |
|---|---|---|---|
| Class | 1st layer RE-rich | 2nd layer RE-rich | Type |
| 1 | Tcomp exists | Tcomp exists | 1 |
| 2 | No Tcomp | Tcomp exists | 2 |
| 3 | Tcomp exists | No Tcomp | 3 |
| 4 | No Tcomp | No Tcomp | 4 |

| QUADRANT II (P Type) | | | |
|---|---|---|---|
| Class | 1st layer RE-rich | 2nd layer TM-rich | Type |
| 5 | Tcomp exists | No Tcomp | 3 |
| 6 | No Tcomp | No Tcomp | 4 |

| QUADRANT III (P Type) | | | |
|---|---|---|---|
| Class | 1st layer TM-rich | 2nd layer TM-rich | Type |
| 7 | No Tcomp | No Tcomp | 4 |

| QUADRANT IV (A Type) | | | |
|---|---|---|---|
| Class | 1st layer TM-rich | 2nd layer RE-rich | Type |
| 8 | No Tcomp | Tcomp exists | 2 |
| 9 | No Tcomp | No Tcomp | 4 |

As noted earlier, means for applying an initial auxiliary magnetic field Hini. is necessary in order to enable over-writing. This means is usually attached to a recording apparatus.

In known non-over-writing opto-magnetic recording apparatus the provision of such means is not necessary and, indeed, is harmful. This is because the initial auxiliary magnetic field Hini. is stronger than the recording magnetic field, so that when applied to a non-over-write type medium, it may erase information which is to be maintained and information which has just been recorded.

For these reasons, hitherto, conventional non-over-write type opto-magnetic recording apparatus and over-writable opto-magnetic recording apparatus have been designed, manufactured and used separately.

From the standpoint of users, however, purchasing two types of apparatus is quite unacceptable considering purchasing cost, space and maintenance cost.

SUMMARY OF THE INVENTION

Accordingly, an object of the present invention is to provide an opto-magnetic recording apparatus comprising:

rotation means for rotating an opto-magnetic recording medium;

initial auxiliary magnetic field applying means for applying an initial auxiliary magnetic field;

a laser beam source;

modulation means for pulse-modulating the laser beam intensity, in accordance with the binary information to be recorded, between level which heats the recording medium to a temperature suitable for forming one of a bit having upward magnetization and a bit having a downward magnetization and a low level for heating the recording medium to a temperature suitable for forming the other of said bits, recording magnetic field applying means; and shifting means for shifting said initial auxiliary magnetic field applying means at least between two positions including a first position for over-write mode operation where said initial auxiliary magnetic field applying means applies the initial auxiliary magnetic field to said recording medium and a second position for non-over-write mode operation where said initial auxiliary magnetic field applying means does not apply the initial auxiliary magnetic field to said recording medium.

The shifting means may or may not be provided with a power source for shifting the initial auxiliary magnetic field applying means. In the latter case, the shifting is effected by manual force exerted by the user.

THE BEST MODE FOR CARRYING OUT OF THE INVENTION

The present invention will be more fully understood from the following description of the preferred embodiments which are only for illustrative purposes and not intended as limiting the scope of the invention.

Figure 13:
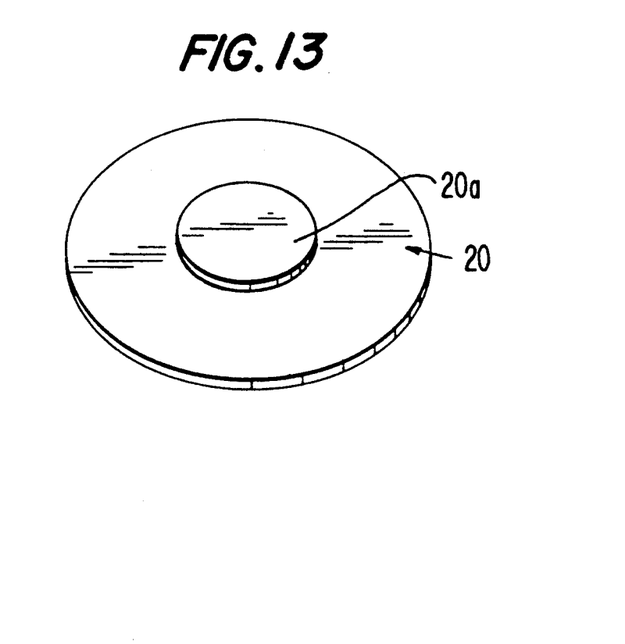
FIG. 13 is a perspective view of a disk-type medium.
Figure 14:
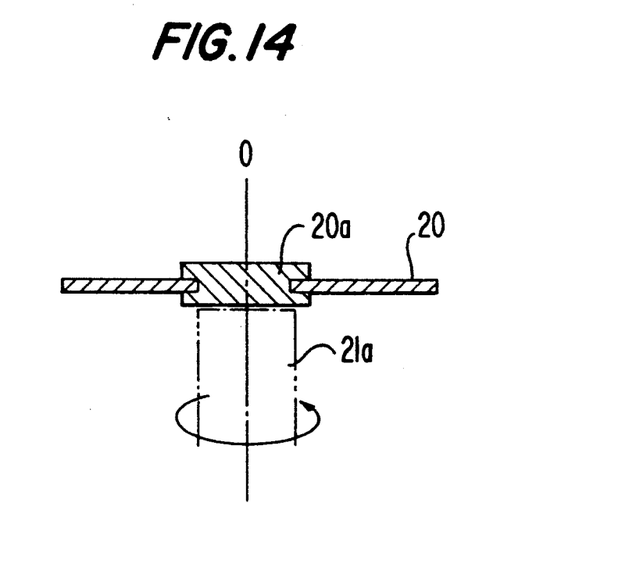
FIG. 14 is a sectional view of the medium shown in FIG. 13.

FIGS. 13 and 14 show a disk-type opto-magnetic recording medium.

The disk is provided at its center with a center hub 20a which holds the medium 20. The center hub 20a is driven by a rotary shaft 21a which in turn is driven by a later discussed power source. In most cases, in order to facilitate handling, the medium 20 is accommodated in a cartridge case (housing) 11. The disk and the cartridge case are collectively referred to as a cartridge 10.

The cartridge case 11 has a window 11a formed in the underside thereof and a window 11b formed in the upper side thereof. The window 11a has a circular portion which is provided so as not to hamper the rotary shaft 21a when it magnetically chucks the center hub 20a and a rectangular portion which allows a magnet device 25 for applying a recording magnetic field Hb or a head (referred to also as pickup) which includes a laser beam source 23 to make access to the medium.

Figure 15:
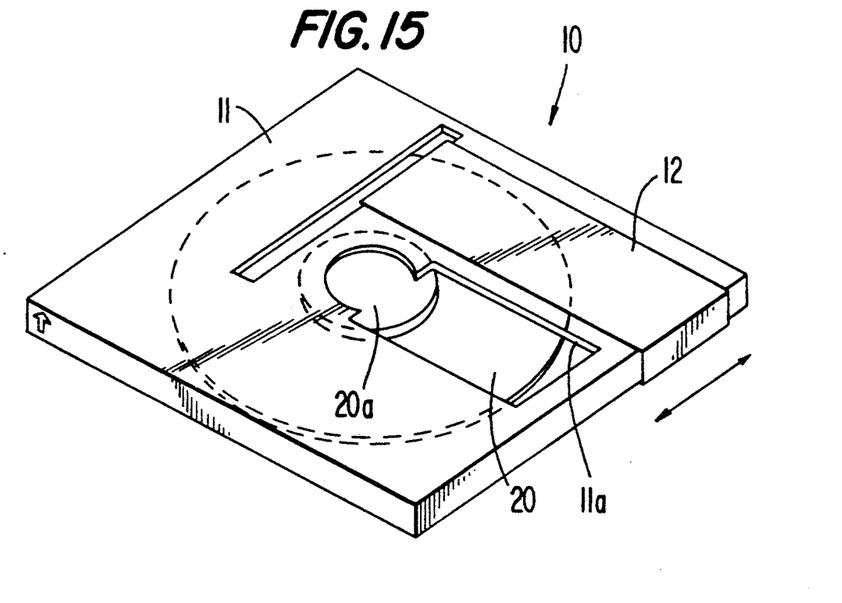
FIG. 15 is a perspective view showing the underside of the cartridge accommodating a medium.
Figure 16:
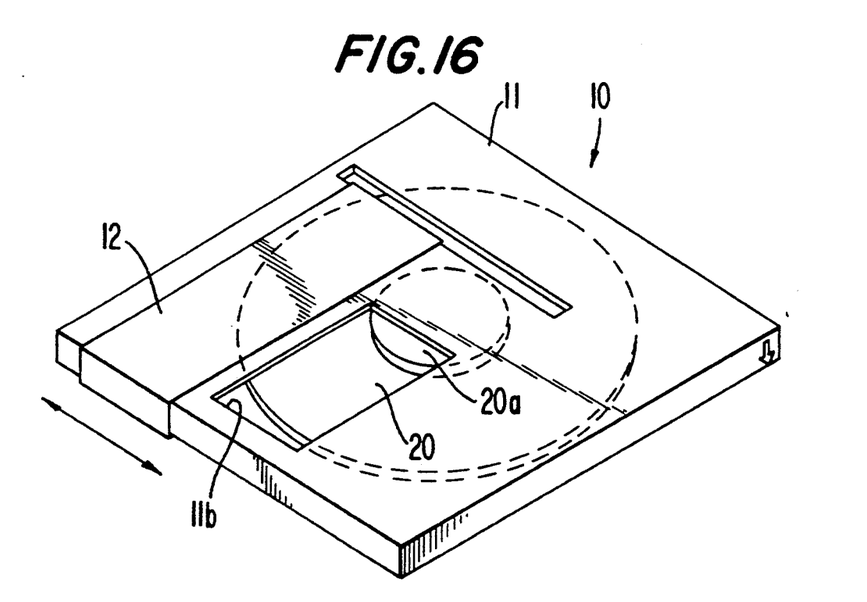
FIG. 16 is a perspective view showing the upper side of the cartridge.

The window 11b formed in the upper side has a rectangular form and is provided for the purpose of allowing access of the head including the laser beam source 23 or the magnet device 25 for applying recording magnetic field Hb. A shutter 12 is provided for closing the windows 11a, 11b when the recording is not conducted. The shutter 12 is slidable in the direction of arrows shown in FIGS. 15 and 16 so as to open and close the windows.

Figure 17:
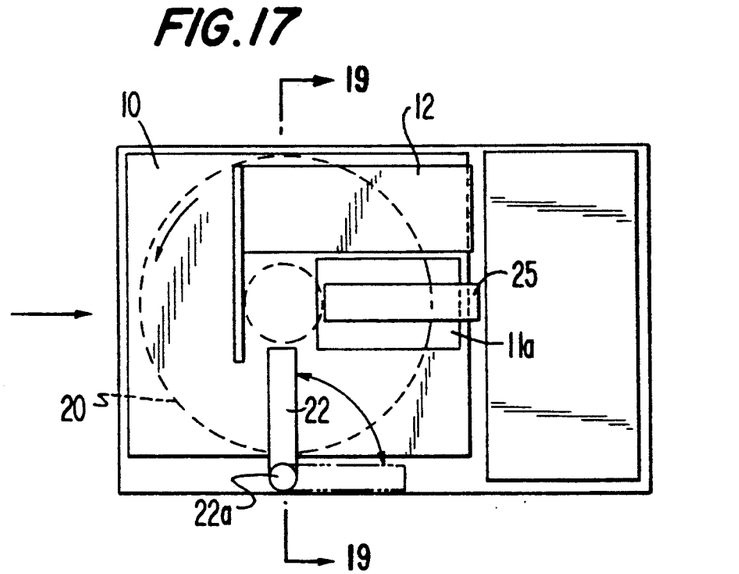
FIG. 17 is a plan view of the whole recording apparatus embodying the present invention.
Figure 19:
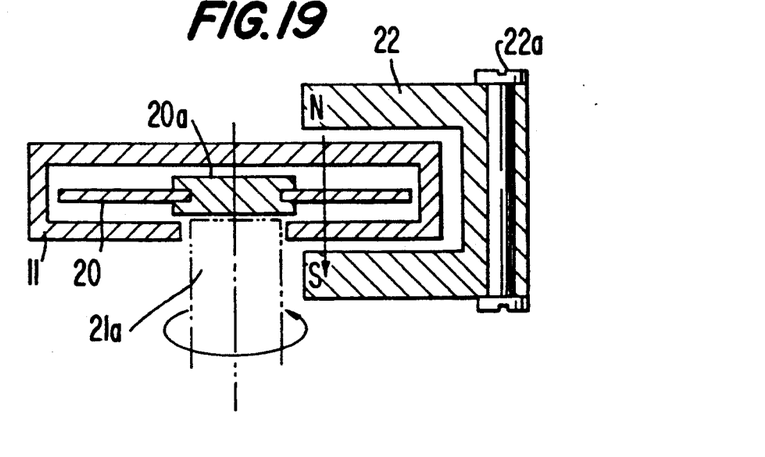
FIG. 19 is a sectional view taken along line 19—19 of FIG. 17.

FIG. 17 is a schematic plan view of the opto-magnetic recording apparatus. A magnet device 22 for applying an initial auxiliary magnetic field Hini. may be a solenoid or a permanent magnet, although a permanent magnet is used in this embodiment. As shown in FIG. 19, the magnet device 22 has a substantially U-shaped cross-section and is supported by a hinge 22a so as to be pivotable in a plane which is parallel to the surface of the medium 20.

Figure 18:
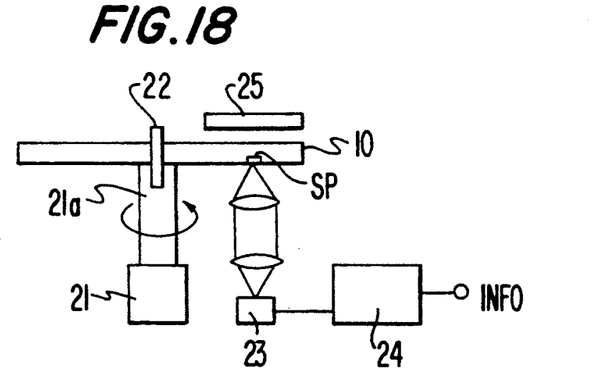
FIG. 18 is a schematic front elevational view of the recording device shown in FIG. 17.

In FIGS. 17 to 19, the magnet device 22 is in operative position where it can apply the initial auxiliary magnetic field Hini. to the medium. The magnet device 22 is pivotally supported by a hinge 22a so that it can be swung to a retracted position shown in phantom in FIG. 17 by a manual force or by means of a motor. The magnet device 22 does not apply a magnetic field to the medium when it is in the retracted position. Thus, the retracted position is a position for enabling the apparatus to operate in non-over-write mode.

When the magnet device 22 is in the operative position, the laser beam source 23 emits a laser beam having a high level or a low level so as to form a spot SP on the medium, in accordance with the pulse modulated output corresponding to the binary information INFO from a modulator 24 shown in FIG. 18.

Figure 20:
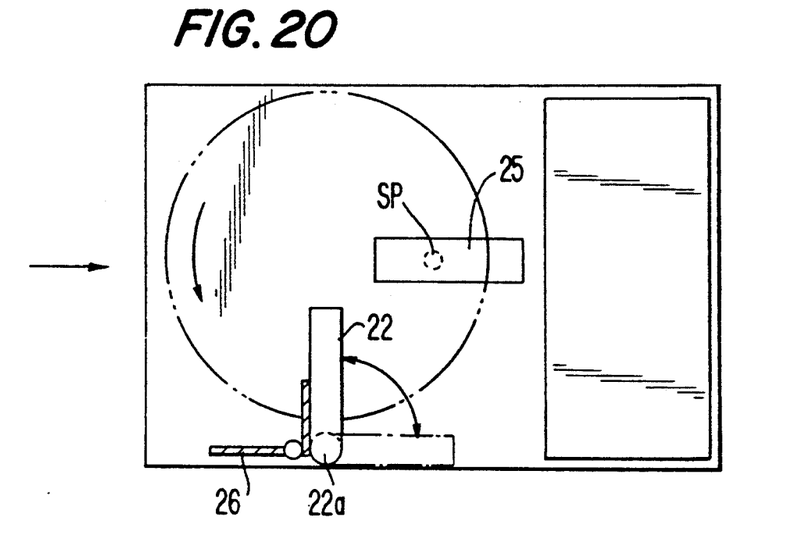
FIG. 20 is a plan view of the coil spring apparatus used in the apparatus shown in FIG. 17.

Preferably, the magnet device 22 is provided with a coiled spring 26 which normally urges the magnet device 22 to the operating position as shown in FIG. 20.

Figure 21:
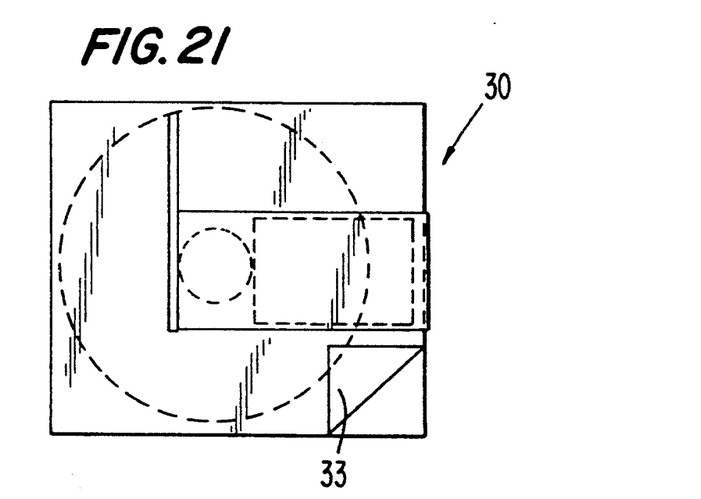
FIG. 21 is a plan view of a non-over-write type cartridge.

FIG. 21 shows an example of the cartridge accommodating a medium of the type which does not enable over-writing (this type of cartridge will be referred to as a "non-over-write type cartridge"). The cartridge 30 of non-over-write type has a projection 33 which, when the cartridge 30 is inserted into the medium receiving opening of the apparatus, contacts the magnet device 22 which is urged to the operating position and forcibly moves it to the retracted position against the urging force of the coiled spring 26.

In consequence, the medium can be used for recording without being affected by the initial auxiliary magnetic field Hini.

The magnet device 22 automatically resumes the operating position when the cartridge 30 is withdrawn from the apparatus.

Figure 22:
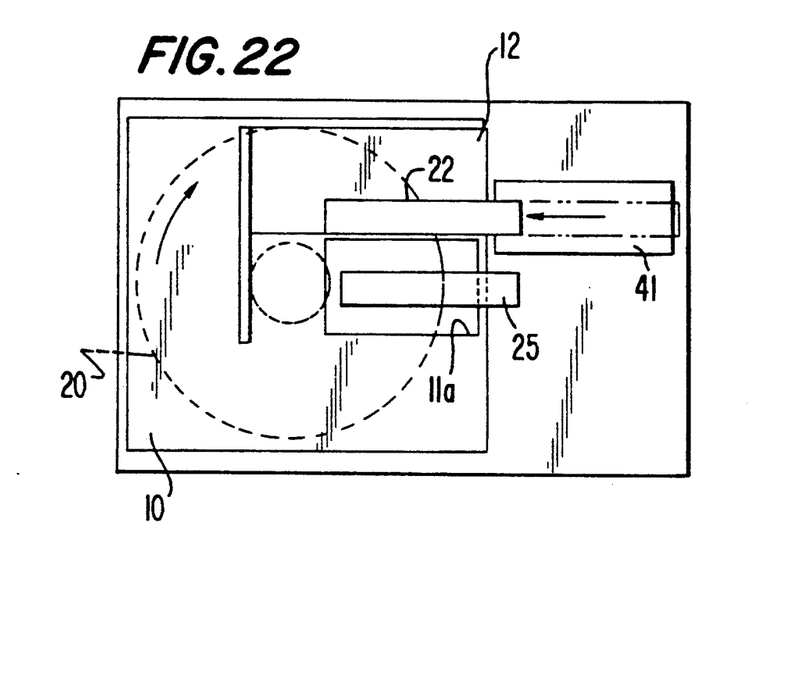
FIGS. 22 and 23 are plan views of whole recording apparatus which are different embodiments of the present invention.
Figure 23:
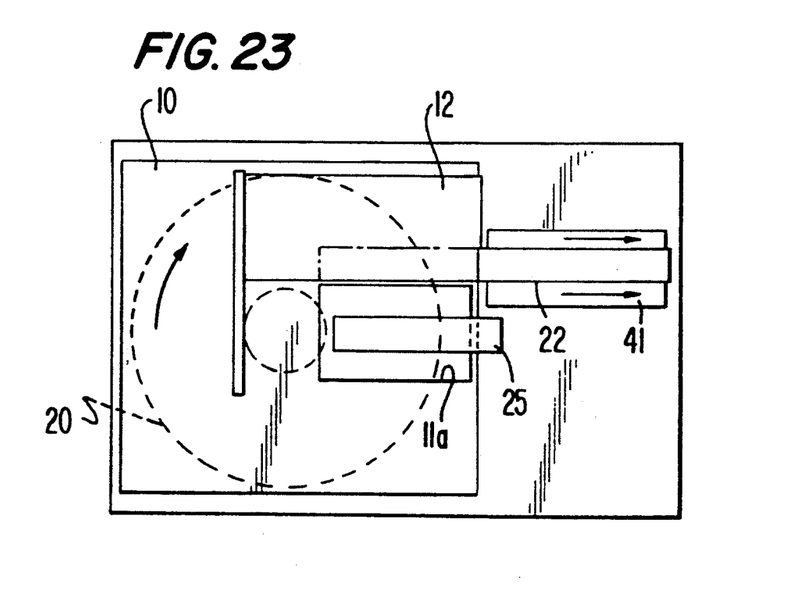

FIGS. 22 and 23 show arrangements in which the magnet device 22 is moved between the operating position and the retracted position on a slider 41 by the power of a motor or by means of the slider 41 sliding when contacted by a projection on the cartridge. FIG. 22 shows the state in which the magnet 22 is in the operating position, while FIG. 23 shows the magnet 22 in the retracted position.

The cartridge of over-write type may be provided with a special mark (not shown), while the cartridge of non-over-write type may lack such a mark. The apparatus has a sensor capable of sensing such a mark. When a cartridge is loaded, the sensor discriminates whether the loaded cartridge is of the over-write type or non-over write type. In the former case, the slider 41 operates to bring the magnet 22 to the operative position. In the latter case, the slider 41 operates to bring the magnet device to the retracted position.

Figure 24:
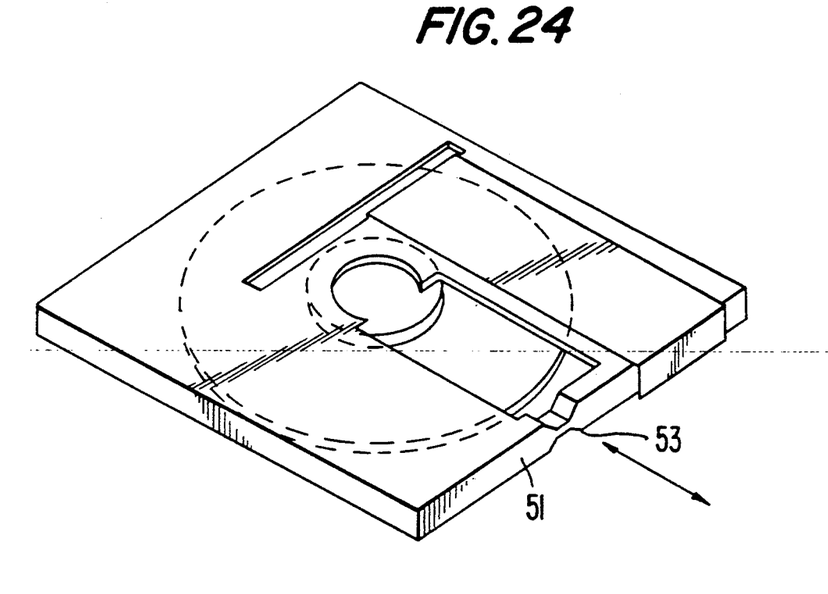
FIG. 24 is a perspective view showing an example of an over-write type cartridge.
Figure 25:
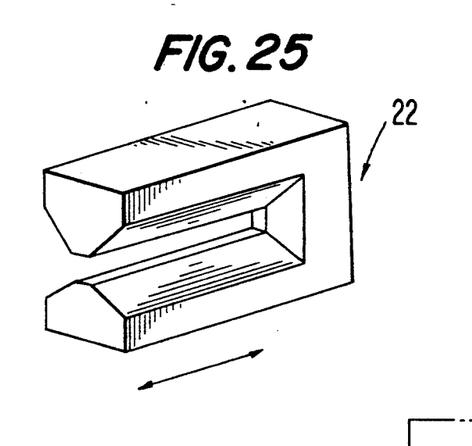
FIG. 25 is a perspective view of a magnet apparatus.
Figure 26:
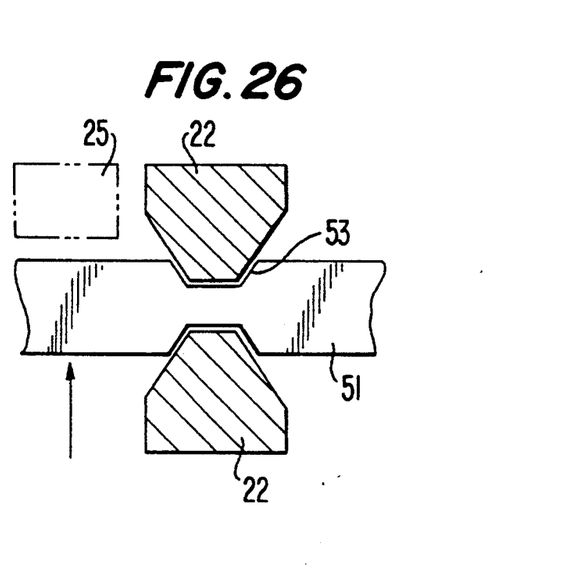
FIG. 26 is an illustration of the positional relationship between the cartridge shown in FIG. 24 and the magnet device shown in FIG. 25.

FIGS. 24 to 26 show a modification of the arrangement shown in FIGS. 22 and 23. In this modification, the over-write type cartridge 51 is provided with a special notch 53, while the cartridge of non-over-write type lacks such a notch. The magnet device 22 has a substantially U-shaped form as shown in FIG. 25 so as to fit to the notch 53 in the cartridge 51.

Thus, the magnet device 22 is allowed to slide to the central position so as to apply the initial auxiliary magnetic field Hini. to the medium only when the cartridge is of the over-write type.

The cartridge of non-over-write type lacks the notch 53 so that the magnet 22 cannot slide in contact with the case 51. Therefore, the magnet device 22 does not apply the initial auxiliary magnetic field Hini. to the medium 20.

As has been described, according to the present invention, there is provided an over-writable opto-magnetic recording apparatus in which an initial auxiliary magnetic field Hini. applying means, which is necessary for over-write type recording medium but harmful for non-over-write type medium, is shifted by a shifting means. The shifting is such that, when an over-write type recording medium is used, the initial auxiliary magnetic field applying means is set in a first position where it can apply the initial auxiliary magnetic field Hini. to the medium, whereas, when a non-over-write medium is used, the initial auxiliary magnetic field applying means is set in a second position where the initial auxiliary magnetic field is not applied to the medium. According to the invention, therefore, a single opto-magnetic recording apparatus can adapt both to mediums of over-write type and mediums of non-over-write type.

What is claimed is:

1. An opto-magnetic recording apparatus having an over-write operation mode and a non-over-write operation mode and comprising:

rotation means for rotating an opto-magnetic recording medium;

magnet means for applying an initial auxiliary magnetic field to the recording medium during said over-write operation mode;

a laser beam source for providing a laser beam for irradiating the recording medium;

modulation means for pulsed-modulating the intensity of the laser beam, in accordance with binary information to be recorded, between a high level which is effective to record one of a bit having upward magnetization and a bit having downward magnetization on the recording medium and a low level which is effective to record the other of said bits thereon;

recording magnetic field applying means for applying a recording magnetic field to the recording medium during said irradiation of the recording medium by the laser beam; and shifting means for supporting said magnet means and for shifting said magnet means between a first position for said over-write mode operation and at which said magnet means applies the initial auxiliary magnetic field to the recording medium when the recording medium is of an over-write type, and a second position for said non-over-write mode operation and at which said magnet means does not apply the initial auxiliary magnetic field to the recording medium when the recording medium is of a non-over-write type.

2. A recording apparatus according to claim 1, wherein said shifting means shifts said magnet means in a plane substantially parallel to the surface of the recording medium.

3. A recording apparatus according to claim 2, wherein said shifting means includes means for supporting said magnet means pivotally about an end thereof.

4. A recording apparatus according to claim 2, wherein said shifting means includes means for supporting said magnet means slidably.

5. A recording apparatus according to claim 1, further comprising means for biasing said magnet means toward said first position.

6. A recording apparatus according to claim 1, wherein said shifting means includes discriminating means responsive to the recording medium for discriminating if the recording medium is of said over-write type or said non-over-write type, said magnet means being positioned at said first position if said discriminating means discriminates that the recording medium is of said over-write type.

7. A recording apparatus according to claim 6, wherein said discriminating means operates upon loading of the recording medium on the recording apparatus to discriminate if the recording medium is capable of over-writing or not.

* * * * *